(12) United States Patent
Yeh

(10) Patent No.: US 6,382,545 B1
(45) Date of Patent: May 7, 2002

(54) FISHING REEL

(76) Inventor: Shih-Yuan Yeh, No. 260, Chen-Fu Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/908,270

(22) Filed: Jul. 18, 2001

(51) Int. Cl.7 .............................................. A01K 89/00
(52) U.S. Cl. ........................................ 242/317; 192/45
(58) Field of Search ................................ 242/317, 293, 242/295, 298, 299, 318; 192/45

(56) References Cited

U.S. PATENT DOCUMENTS

| | | | | |
|---|---|---|---|---|
| 2,858,998 A | * | 11/1958 | Nadolskey | 242/317 |
| 4,461,435 A | * | 7/1984 | Kovalovsky | 242/318 |
| 5,407,144 A | * | 4/1995 | Ryall | 242/295 |
| 5,590,847 A | * | 1/1997 | Ament | 242/317 |
| 5,918,826 A | * | 7/1999 | Arkowski | 242/317 |
| 5,921,492 A | * | 7/1999 | Bauer | 242/317 |

* cited by examiner

*Primary Examiner*—Emmanuel M. Marcelo
(74) *Attorney, Agent, or Firm*—Hedman & Costigan, P.C.

(57) ABSTRACT

A fishing reel is composed of a spool base (10), a rotating plate (20), a spool (30), a driving roller (40), a limiting wheel (50), a locking device (60), and a trigger device (70). The locking device (60) is able to control the rotating status of the fishing reel from free rotations to unidirectional rotation simply by turning the clutch knob (63).

6 Claims, 6 Drawing Sheets

FISHING REEL

BACKGROUND OF THE INVENTION

1. Field of the Invention

The present invention relates to a fishing reel, and more particularly to a fishing reel having a clutch knob to control the rotating statuses of the unidirectional reel and having simple structure so as to be produced easily.

2. Description of Related Art

Fishing is a popular way to release working pressure and enjoy natural beauty for people all over the world. Most people fish for fun and enjoy the achievement of catching fish. Therefore, all types of fishers need to have a fishing rod and other fishing accessories handy because the unexpected opportunity to catch the big one may appear. In particular, fly fishing has been considered the ultimate form of grace in angling and unlike many other styles a center pin reel is still used. Despite many refinements, such a reel is much simpler than other reels such as multiplier and fixed spool reels, in that it is in essence a drum revolving on a spindle. In use, line is casted by flexing the rod back and forth, and the momentum of the released fly and line revolves the reel until the fly drops to the water. To retrieve the fly, the fisherperson has to revolve the drum of the reel in the direction opposite to that when releasing the line. If a fish is hooked and puts a struggle further line may be pulled from the reel because the fisherperson cannot immediately overpower the fish. In order to prevent too much line undesirably being pulled from the reel a ratchet system is fitted within the reel whereby varying levels of resistance to outward rotation of the drum is limited. Thus, the reel has a unidirectional mode.

However, a drawback of the conventional reel still exists which is that the unidirectional structure of the conventional fishing reel is complicated and so the conventional fishing reel has a high manufacture cost and is not easy to maintain by the owner. In particular, fishing is often done in wilderness areas and in all types of weather whereby the reel is exposed to extremes of temperature, water penetration, mud sand and grit, and so on which are all detrimental to the reliable performance of a refined fishing reel.

Therefore, the present invention has arisen to mitigate and/or obviate the disadvantages of the conventional fishing reel.

SUMMARY OF THE INVENTION

The main objective of the present invention is to provide a fishing reel, wherein the rotating statuses of the reel are controlled by a clutch knob.

An another objective of the present invention is to provide a fishing reel that has simple structure.

Further benefits and advantages of the present invention will become apparent after a careful reading of the detailed description with appropriate reference to the accompanying drawings.

DETAILED DESCRIPTION OF THE INVENTION

Figure 1:
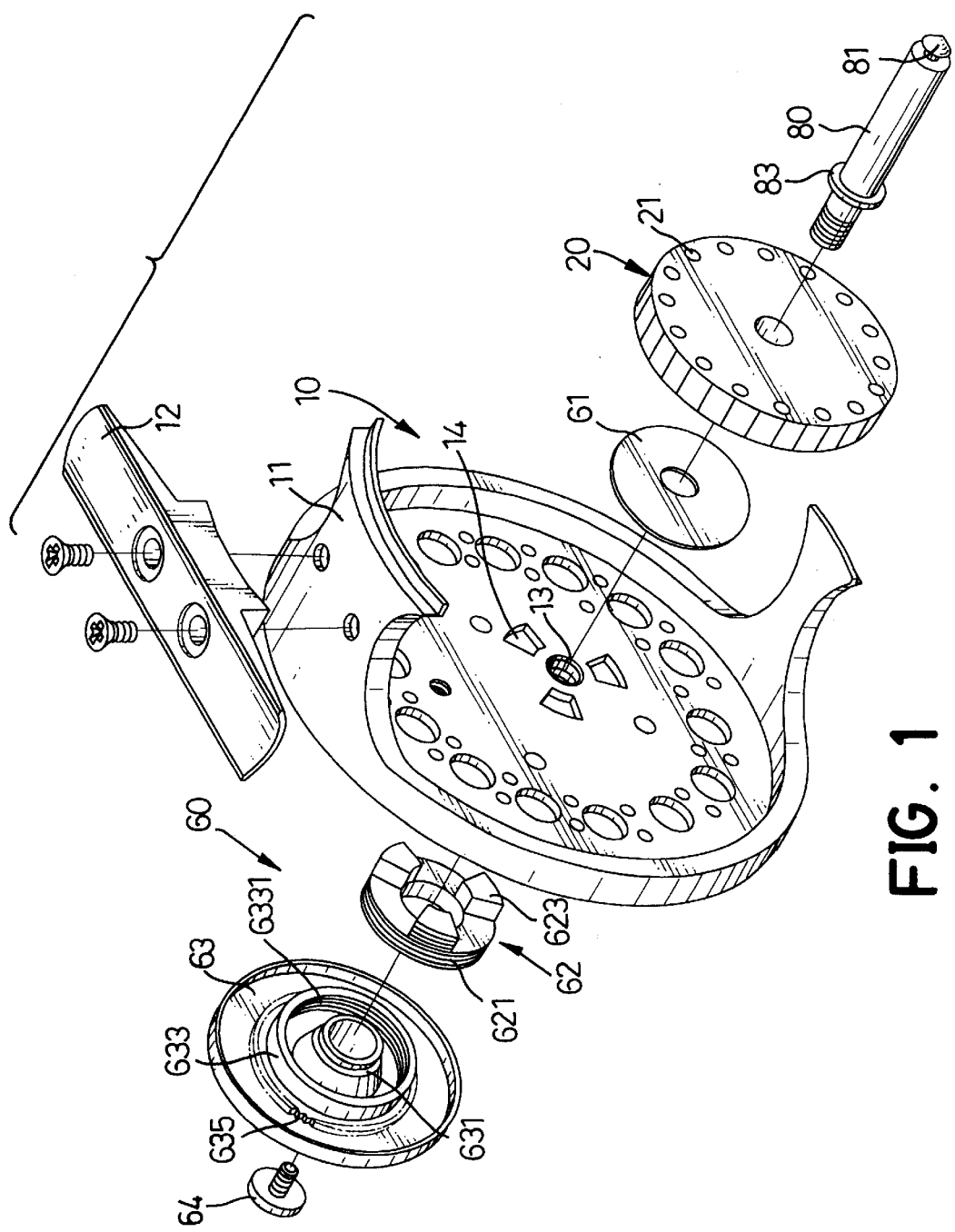
FIG. 1 is an exploded perspective view of a base part of a fishing reel in accordance with the present invention.
Figure 2:
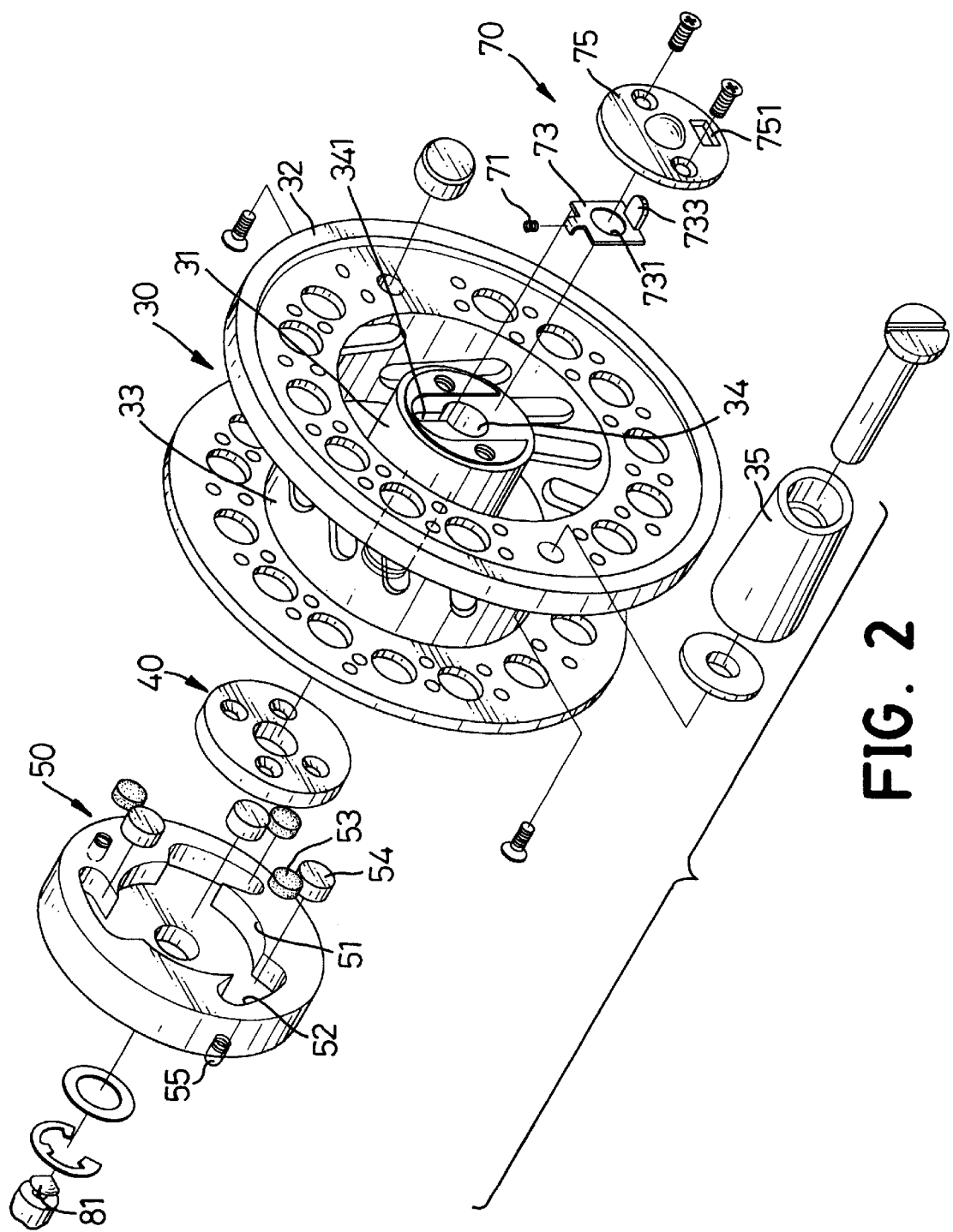
FIG. 2 is an exploded perspective view of a spool part of the fishing reel accompanying the base part in FIG. 1.

With reference to FIGS. 1 and 2, a fishing reel is composed of a spool base (10), a rotating plate (20), a spool (30), a driving roller (40), a limiting wheel (50), a locking device (60), and a trigger device (70). These elements of the fishing reel are arranged axially on or penetrated by an axle (80).

The spool base (10) is a round plate and has two opposed arms (11) protruding outwardly and laterally from one face of the spool base (10). A fixing member (12) is firmly screwed on one arm (11) of the spool base (10) and adapted to be detachably secured on a fishing rod (not shown). An axle aperture (13) is defined in the center of the round plate of the spool base (10). Multiple limit holes (14) are defined in the round plate and around the axle aperture (13).

The rotating plate (20) is rotatably sandwiched between the spool base (10) and the limiting wheel (50), and has a plurality of concavities (21) defined around one edge facing toward to the spool (30).

The spool (30) is secured on the axle (80) and is composed of a pole (31), two ring plates (32) with one combining bridge (33) formed between the ring plates (32), and a connecting plate extending between the pole (31) and the combining bridge (33). The ring plates (32) and the combining bridge (33) form a U-shaped passage (FIGS. 2 and 4) to receive a line. Multiple holes are defined in the ring plates (32) and the combining bridge (33) to ventilate heat from the rotating spool (30) when the fly line is released or collected swiftly to the spool (30), as well as reducing the overall weight of the reel. An axle channel (34) is defined axially in the center of the pole (31) and a groove (341) is defined outwardly from the axle channel (34) at a face of the pole (31) confronting to the trigger device (70). Additionally, a handle (35) is firmly configured on the outer one of the ring plates (32) of the spool (30) to enable a user to control the fishing reel.

The driving roller (40) is sandwiched between the limiting wheel (50) and the spool (30) and firmly secured on the axle (80).

The limiting wheel (50) has two opposed sides and a roller recess (51) is defined in a first side facing the spool (30) to receive the driving roller (40) inside. A plurality of guide trenches (52) are defined in the limiting wheel (50) and biased extending in the same direction from the driving roller recess (51). Each guide trench (52) has a soft cylinder (53) received in a distal end of the guide trench (52) and a hard cylinder (54) adjacent to the soft cylinder (53). The hard cylinder (54) is in physical contact with the guide trench (52) when the hard cylinder (54) is confined therein. The guide trench (52) is defined in a special shape that allows the hard cylinder (54) to freely rotate and move close to the soft cylinder (53) but limits the hard cylinder (54) to rotate and leave the soft cylinder (53) to limit the rotation of the spool (30) to one direction. In other words, the guide trench (52) has larger and smaller widths than a diameter of the hard cylinder (54) in different portions to achieve the limitation of the hard cylinder (54).

Thus when the driving roller (40) is attempted to be rotated in a direction to roll the hard cylinder (54) away from the soft cylinder (53), which happens when a fish is on the line and tensions the line against reel drag, the hard cylinder (54) tends to roll away from the soft cylinder (53) towards the diminishing dimension of the width, and the hard cylinder (54) is instantly caught in a middle portion of the guide trench (52).

Additionally, multiple hard springs (55) are immovably mounted on the second side of the limiting wheel (50) to rabbet in the concavities (21) of the rotating plate (20). The multiple hard springs (55) can be twisted when the unpredictably excessive vigorous rotation of the reel happens so as to avoid the breakage or damage to the rotating plate (20) and the limiting wheel (50) of the unidirectional fishing reel.

The locking device (60) includes a cushion (61), a lock collar (62), and a clutch knob (63). The cushion (61) is set between the spool base (10) and the rotating plate (20). The lock collar (62) has a threaded periphery (621) and multiple stubs (623) formed on a face adjacent to the spool base (10). The stubs (623) are in accordance with and rabbeted to the limit holes (14) of the spool base (10) in position and in quantity. The clutch knob (63) is rotatably engaged with the spool base (10) by a screw rod (64) and has a strut (631) erected at the center thereof, and an inner flange (633) formed toward to spool base (10) and surrounding the strut (631). The inner flange (633) has a thread (6331) defined in an inner surface thereof and mated with the threaded periphery (621) of the lock collar (62). Additionally, a toothed ring (635) is formed around the inner flange (633).

The trigger device (70) is composed of a resilient element (71), a trigger sheet (73), and a cap (75). The resilient element (71) is a spring and which is compressed by the trigger sheet (73). The trigger sheet (73) has through hole (731) defined in the center thereof and a tongue (733) extending outwardly on the trigger sheet (73). The cap (75) is firmly attached by two screws on the face of the pole (34) of the spool (30) and encloses the trigger sheet (73) between the pole (34) and the cap (75). The cap (75) has a tongue hole (751) defined therein to allow the tongue (733) to extend therethrough so that the trigger sheet (73) may be manipulated from outside of the spool (30).

The axle (80) has an arrow-head insertion (81) formed on one distal end of the axle (80) to insert into the through hole (731) of the trigger sheet (73) when the spring is pressed by the trigger sheet (73). Then, the axle (80) is locked at a neck of the arrow head insertion (81) when the trigger sheet (73) is moved to the original place by the resilient force of the resilient spring (71) so as to confirm the steady combination of the unidirectional fishing reel. A stop flange (83) is formed in a middle section of the axle (80) to separate the rotating plate (20) and the limiting wheel (50). The stop flange (50) limits a fixed distance from the knob (63) to the stop flange (83) so that there is no relative movement between the clutch knob (63) and the spool base (10).

Figure 3:
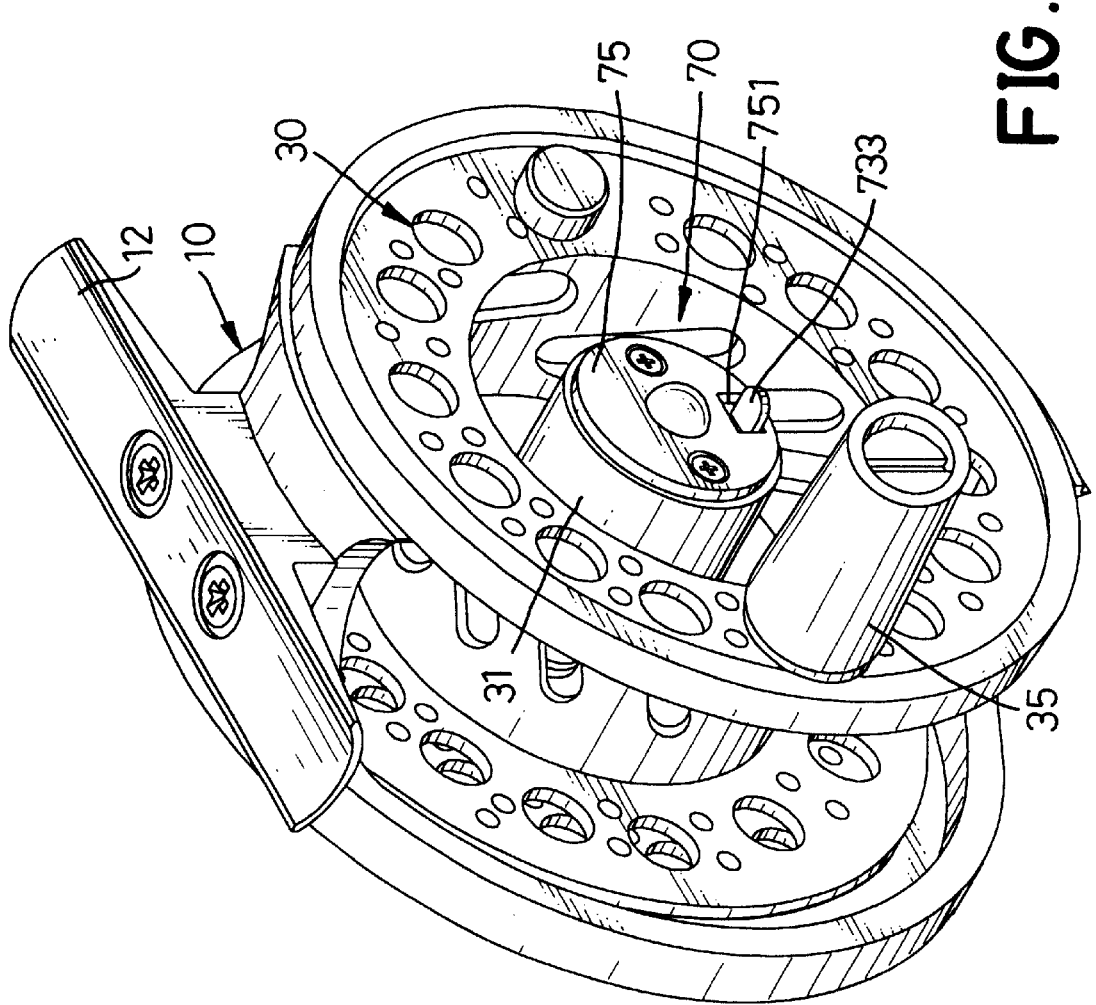
FIG. 3 is a perspective view showing the fishing reel in combination.
Figure 4:
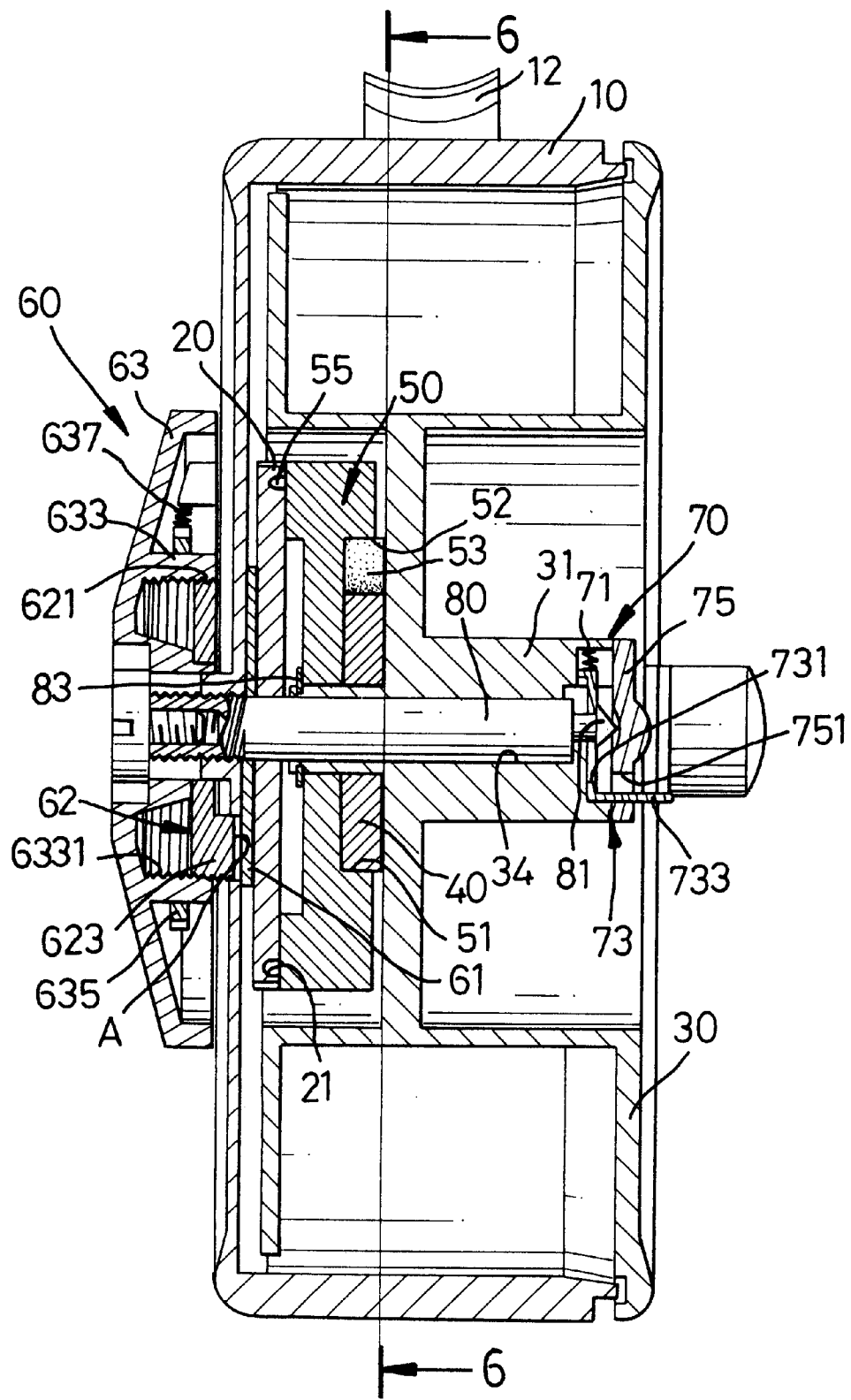
FIG. 4 is a side cross-sectional view of the fishing reel showing that a lock collar unlocks a cushion.
Figure 5:
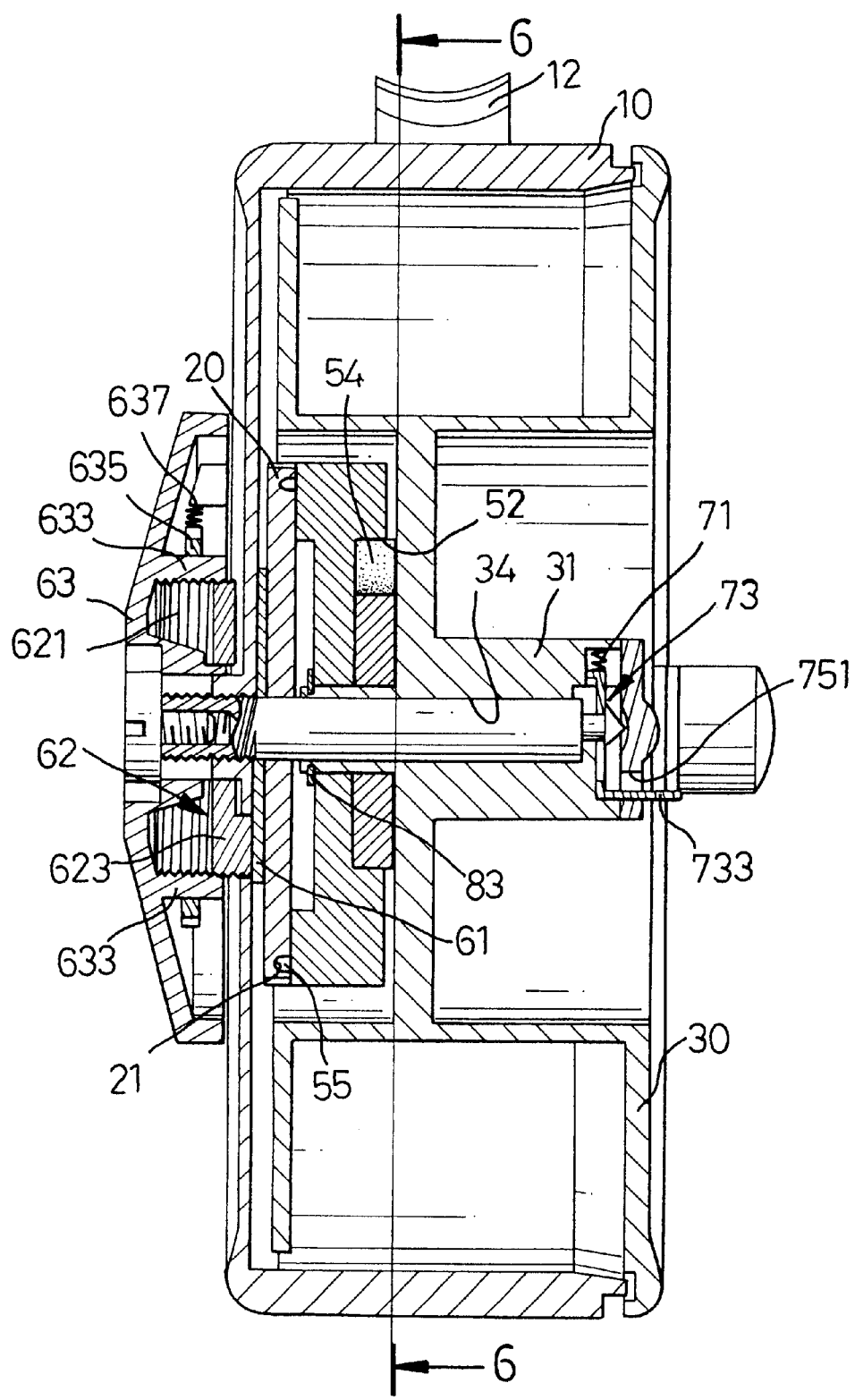
FIG. 5 is side cross-sectional view of the fishing reel showing that the lock collar locks the cushion.

Now referring to FIGS. 3, 4 and 5, wherein all the elements of the fishing reel are combined together, and more particularly to FIG. 4. A space (A) is defined between the stubs (623) of the lock collar (62) and the cushion (61) i.e. the stubs (623) do not compress the rotating plate (20). Therefore, there is no locking limitation to the fishing reel and all elements penetrated by the axle (80) are freely rotated with the axle, except the spool base (10) which is firmly secured on the fishing rod. When the handle (35) drives the fishing reel, the spool (30) can be rotated in two directions to release or collect the line thereon so that the fishing reel is in the status of free rotation.

When the clutch knob (63) turns, the clutch knob (63) drives the lock collar (62) to move forward or backward because there is no relative movement between the knob (63) and the spool base (10), and the limit holes of the base (10) restrict the rotation of the lock collar (62). When the stubs (623) tightly compress the cushion (61), the rotating plate (20) is restricted from free rotation so as to lock the limiting wheel (50). Therefore, the driving roller (40) rotated with the axle (80) driven by the handle (35) is limited to roll unidirectionally.

Additionally, the toothed ring (635) of the knob (60) contacts with a spring (637) to form a "clicker" assembly which sounds when turning the knob (63). The sound is an alarm when a fish take the bait and runs with the line.

Figure 6:
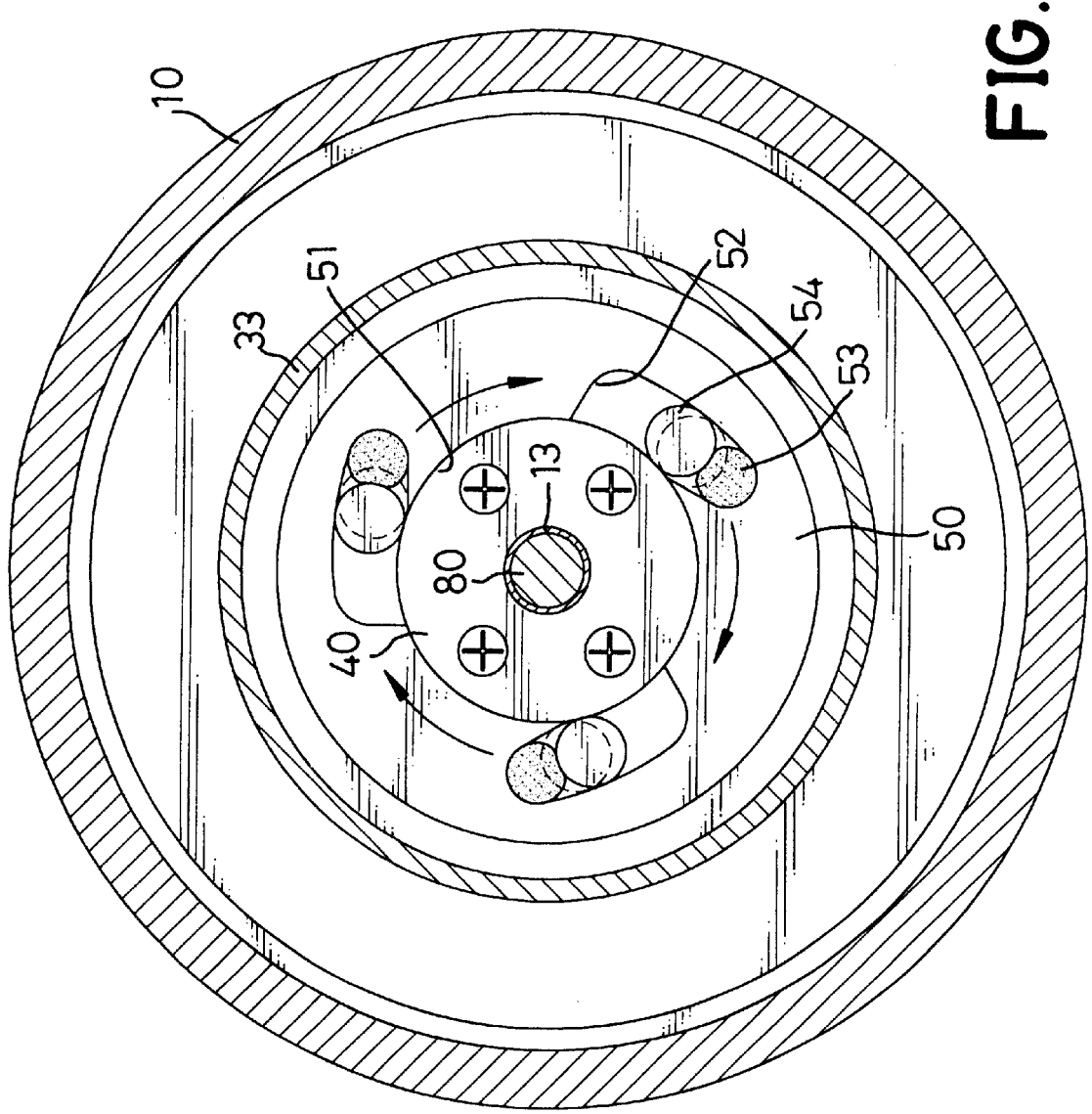
FIG. 6 is a front cross-sectional view of the fishing reel along line 6—6 in FIG. 4 and showing a movement of the driving roller of the fishing reel in a unidirectional status.

Now referring to FIG. 6, the driving roller (40) is driven clockwise to make the hard cylinder (54) rotate and resiliently compress the soft cylinder (53). However, when rotation of the driving roller (40) is stopped, the soft cylinder (53) resumes its original shape and so pushes the hard cylinder (54) back to its original position. As mentioned before, the guide trench (52) limits the counterclockwise rotation of the driving roller by restricting movement of the hard cylinder (54).

Although the present invention is directed towards a fly fishing reel, it is to be appreciated that the inventive reel is suitable for other kinds of fishing.

Although the invention has been explained in relation to its preferred embodiment, it is to be understood that many other possible modifications and variations can be made without departing from the spirit and scope of the invention as hereinafter claimed.

What is claimed is:

1. A fishing reel comprising:
   a spool base (10) adapted to be detachably secured on the fishing rod;
   a rotating plate (20) rotatably engaged with the spool base (10) and having a plurality of concavities (21) defined around a peripheral edge of the rotating plate (20);
   a spool (30) sandwiching the rotating plate (20) with the spool base (10) and having a handle (35) firmly connected to one side of the spool (30) so that the handle (35) is able to drive the spool (30) to rotate;
   a limiting wheel (50) rotatably engaged with the rotating plate (20) and having:
      a driving roller recess (51) defined in one side facing the spool (30);
      a plurality of guide trenches (52) defined in the limiting wheel (50) to communicate with the driving roller recess (51);
      a plurality of soft cylinders (53) deformably received in a corresponding one of the plurality of guide trenches (52);
      a plurality of hard cylinders (54) each movably received in a corresponding one of the guide trenches (52) to be selectively engaged with a corresponding one of the soft cylinders (53); and
      a plurality of springs (55) secured on another side of the limiting wheel (50) to contact with the rotating plate (20), wherein the springs (55) provide a resistance for actuation of the unidirectional rotation of the fishing reel;
   a driving roller (40) received inside the roller recess (51) and synchronously rotatable with the spool (30) to engage with the hard cylinders (54);
   a locking device (60) mounted on the spool base (10) to selectively limit the rotation of the limiting wheel (50);
   means for keeping the spool base (10), the rotating plate (20), the spool (30), the driving roller (40), and the limiting wheel (50) assembled together; and wherein the improvements comprise:
multiple limit holes (14) defined in the spool base (10), the locking device (60) having a cushion (61) disposed between the spool base (10) and the rotating plate (20) to selectively lock the rotating plate (20) and the limiting wheel (50); a lock collar (62) having multiple stubs (623) formed to correspond to the limit holes (14) of the spool base (10); and a clutch knob (63) threadingly engaged with the lock collar (62) to control movement of the lock collar (62) relative to the spool base (10), the guide trench (52) is particularly defined to allow the hard cylinder (54) to freely rotate and move close to the soft cylinder (53) when the driving roller (40) rotates in one direction, but to limit the hard cylinder (54) from rotation and leave the soft cylinder (53) to perform unidirectional rotating status of the spool (30).

2. The fishing reel as claimed in claim 1, wherein the spool base (10) is composed of
two arms (11) protruding outwardly and laterally from one face of the spool base (10);
a fixing member (12) mounted on one arm (11) and adapted to be firmly secured to the fishing rod; and
an axle aperture (13) is defined in the spool base (10).

3. The fishing reel as claimed in claim 1, wherein the spool (30) is composed of
a pole (31) penetrated by an axle (80);
two ring plates (32) perpendicularly surrounding and connected to the pole (31) and having one combining bridge (33) formed between the plates (32) to form a U-shaped passage to receive a line;
multiple holes defined in the ring plates (32) and the combining bridge (33) to ventilate heat from the spool (30).

4. The fishing reel as claimed in claim 2, wherein the spool (30) is composed of
a pole (31) penetrated by an axle (80);
two ring plates (32) perpendicularly surrounding and connected to the pole (31) and having one combining bridge (33) formed between the plates (32) to form a U-shaped passage to receive a line;
multiple holes defined in the ring plates (32) and the combining bridge (33) to ventilate heat from the spool (30).

5. The fishing reel as claimed in claim 1, wherein the means is composed of an axle (80) having an arrow-head insertion (81) formed on one distal end of the axle (80) and penetrating the spool base (10), the rotating plate (20), the spool (30), the driving roller (40), and the limiting wheel (50) respectively; and
a resilient element (71);
a trigger sheet (73) resiliently compressing the resilient element (71) and having a through hole (731) defined in a center thereof to receive and lock the insertion (81) of the axle (80) to keep all elements of the fishing reel in assembly;
a tongue (733) extending outwardly from the trigger sheet (73) to control the movement of the trigger sheet (73); and
a cap (75) firmly screwed on the spool (30) to enclose the trigger sheet (73) between the pole (34) and the cap (75) and having a tongue hole (751) defined in the cap (75) so that the trigger sheet (73) may be manipulated from outside of the spool (30).

6. The fishing reel as claimed in claim 5, wherein the trigger device (70) is composed of
a resilient element (71);
a trigger sheet (73) resiliently compressing the resilient element (71) and having a through hole (731) defined in a center thereof to receive and lock the insertion (81) of the axle (80) to keep all elements of the fishing reel in assembly;
a tongue (733) extending outwardly from the trigger sheet (73) to control the movement of the trigger sheet (73); and
a cap (75) firmly screwed on the spool (30) to enclose the trigger sheet (73) between the pole (34) and the cap (75) and having a tongue hole (751) defined in the cap (75) so that the trigger sheet (73) may be manipulated from outside of the spool (30).

* * * * *